(12) United States Patent
Lamparter et al.

(10) Patent No.: US 7,896,434 B2
(45) Date of Patent: Mar. 1, 2011

(54) SEAT ASSEMBLY FOR A VEHICLE

(75) Inventors: Ronald C. Lamparter, Grosse Pointe Shores, MI (US); Patrick M. Glance, Plymouth, MI (US)

(73) Assignee: Syntec Seating Solutions LLC, Sterling Heights, MI (US)

( * ) Notice: Subject to any disclaimer, the term of this patent is extended or adjusted under 35 U.S.C. 154(b) by 0 days.

(21) Appl. No.: 12/875,429

(22) Filed: Sep. 3, 2010

(65) Prior Publication Data
US 2010/0327644 A1 Dec. 30, 2010

Related U.S. Application Data

(63) Continuation of application No. 12/040,181, filed on Feb. 29, 2008, now Pat. No. 7,789,460, which is a continuation of application No. 60/892,543, filed on Mar. 2, 2007, and a continuation of application No. 60/966,403, filed on Aug. 28, 2007.

(51) Int. Cl.
*B62J 1/00* (2006.01)
(52) U.S. Cl. .............. 297/216.13; 297/216.14; 297/216.15; 297/474; 297/475; 297/232; 297/452.18; 297/452.65; 297/471; 297/440.21; 297/440.2
(58) Field of Classification Search ............ 297/230.12, 297/452.65, 483, 473, 216.13, 230.1, 250.1, 297/216.1, 474, 475, 216.15, 452.18, 471, 297/232, 440.21, 440.2
See application file for complete search history.

(56) References Cited

U.S. PATENT DOCUMENTS

| | | | |
|---|---|---|---|
| 3,287,061 A | 11/1966 | Nicholas | |
| 3,385,633 A | 5/1968 | Aizley | |
| 3,768,862 A | 10/1973 | Williams, Jr. | |
| 3,832,002 A | 8/1974 | Eggert, Jr. et al. | |
| 4,218,091 A | 8/1980 | Webster | |
| 4,225,178 A | 9/1980 | Takada | |
| 4,533,110 A | 8/1985 | Hill | |
| 4,810,037 A | 3/1989 | Takagi | |

(Continued)

FOREIGN PATENT DOCUMENTS

FR 2658459 A1 8/1991

(Continued)

*Primary Examiner*—Laurie K Cranmer
(74) *Attorney, Agent, or Firm*—Howard & Howard Attorneys PLLC

(57) ABSTRACT

A seat assembly for a vehicle includes a seat bottom and a seatback. The seatback includes a seatback frame and is selectively rotatable relative to the seat bottom from an upright position to a forward position. A seatbelt assembly includes a retractor coupled to the seatback frame and a belt selectively extendable from and retractable to the retractor. A first end of the belt is disposed in the retractor. A guide is coupled to the seatback frame and defines an orifice with the belt slideably extending through the orifice. The retractor and the guide are fixed relative to the seatback frame and the second end of the belt is fixed to the seatback frame. The retractor, the guide, and both ends of the belt rotate from the upright position to the forward position in response to a force exerted on the seatback frame during rapid deceleration of the seat assembly.

20 Claims, 12 Drawing Sheets

U.S. PATENT DOCUMENTS

| | | | |
|---|---|---|---|
| 4,919,488 A | | 4/1990 | Deegener et al. |
| 5,009,469 A | | 4/1991 | Mouri |
| 5,044,695 A | | 9/1991 | Tsuchiya |
| 5,066,043 A | | 11/1991 | Tokugawa |
| 5,088,794 A | | 2/1992 | Iwami et al. |
| 5,139,311 A | | 8/1992 | Imai et al. |
| 5,253,924 A | * | 10/1993 | Glance .................... 297/452.1 |
| 5,318,341 A | | 6/1994 | Griswold et al. |
| 5,320,411 A | | 6/1994 | Sera |
| 5,328,249 A | | 7/1994 | Ball |
| 5,340,185 A | | 8/1994 | Vollmer |
| 5,364,170 A | * | 11/1994 | West ......................... 297/483 |
| 5,366,268 A | | 11/1994 | Miller et al. |
| 5,462,332 A | | 10/1995 | Payne et al. |
| 5,575,533 A | * | 11/1996 | Glance .................... 297/452.2 |
| 5,641,198 A | | 6/1997 | Steffens, Jr. |
| 5,722,731 A | | 3/1998 | Chang |
| 5,746,476 A | * | 5/1998 | Novak et al. ........... 297/216.13 |
| 5,795,024 A | * | 8/1998 | Collins et al. ............ 297/361.1 |
| 5,851,055 A | * | 12/1998 | Lewis ......................... 297/483 |
| 5,971,490 A | * | 10/1999 | Chang ......................... 297/473 |
| 6,022,074 A | | 2/2000 | Swedenkleff |
| 6,045,186 A | * | 4/2000 | Butt et al. ................... 297/296 |
| 6,113,185 A | | 9/2000 | Yamaguchi et al. |
| 6,164,720 A | | 12/2000 | Haglund |
| 6,217,068 B1 | | 4/2001 | Trainum et al. |
| 6,312,056 B1 | * | 11/2001 | Murphy et al. .............. 297/464 |
| 6,328,386 B1 | | 12/2001 | Good |
| 6,412,876 B2 | | 7/2002 | Nishide |
| 6,485,098 B1 | | 11/2002 | Vits et al. |
| 6,508,515 B2 | | 1/2003 | Vits et al. |
| 6,543,855 B2 | * | 4/2003 | Bruck ................... 297/440.21 |
| 6,554,356 B1 | | 4/2003 | Crose |
| 6,604,599 B2 | | 8/2003 | Yamaguchi et al. |
| 6,648,409 B1 | | 11/2003 | Laporte |
| 6,655,745 B2 | * | 12/2003 | Fohrenkamm et al. ...... 297/481 |
| 6,676,219 B1 | | 1/2004 | Brewer |
| 6,688,685 B2 | | 2/2004 | Kain |
| 6,739,673 B2 | | 5/2004 | Gupta et al. |
| 6,779,841 B2 | * | 8/2004 | Eckendorff ............ 297/216.13 |
| 6,811,186 B1 | | 11/2004 | Fraley et al. |
| 6,817,672 B2 | | 11/2004 | Matsunuma |
| 6,837,540 B2 | | 1/2005 | Yamaguchi et al. |
| 6,886,889 B2 | * | 5/2005 | Vits et al. ............... 297/452.18 |
| 6,908,149 B1 | | 6/2005 | Yamaguchi et al. |
| 6,938,959 B1 | | 9/2005 | Borunda et al. |
| 6,991,286 B2 | | 1/2006 | Nelson et al. |
| 7,000,994 B2 | | 2/2006 | Leighton |
| 7,029,067 B2 | | 4/2006 | Vits et al. |
| 7,040,696 B2 | | 5/2006 | Vits et al. |
| 7,055,905 B2 | | 6/2006 | Spey et al. |
| 7,059,675 B2 | * | 6/2006 | Nelson et al. .......... 297/216.14 |
| 7,063,389 B2 | | 6/2006 | Kennedy, Sr. |
| 7,131,668 B2 | * | 11/2006 | Go ............................. 280/808 |
| 7,137,670 B2 | * | 11/2006 | Gupta et al. ........... 297/452.65 |
| 7,195,316 B2 | | 3/2007 | Shimasaki et al. |
| 7,229,135 B2 | | 6/2007 | Hyatt et al. |
| 7,338,119 B2 | | 3/2008 | Burch |
| 7,354,105 B2 | | 4/2008 | Nelson et al. |
| 7,399,036 B2 | * | 7/2008 | Kowal et al. ........... 297/440.16 |
| 7,500,722 B2 | | 3/2009 | Morris |
| 7,510,245 B2 | * | 3/2009 | Okazaki et al. ............. 297/483 |
| 7,611,197 B2 | * | 11/2009 | Mattes et al. .......... 297/216.16 |
| 2002/0079734 A1 | | 6/2002 | Murphy et al. |
| 2004/0004381 A1 | | 1/2004 | Timon |
| 2004/0183344 A1 | | 9/2004 | Glance et al. |
| 2005/0082815 A1 | * | 4/2005 | Frank et al. ................ 280/801.1 |
| 2005/0121897 A1 | * | 6/2005 | Elizondo et al. ......... 280/801.1 |
| 2005/0168041 A1 | | 8/2005 | Glance et al. |
| 2005/0184577 A1 | | 8/2005 | Nelson et al. |
| 2005/0189800 A1 | | 9/2005 | Nelson et al. |
| 2005/0189801 A1 | | 9/2005 | Mattes et al. |
| 2005/0189802 A1 | | 9/2005 | Mattes et al. |
| 2005/0200172 A1 | | 9/2005 | Graham et al. |
| 2005/0206150 A1 | | 9/2005 | Yamaguchi et al. |
| 2006/0267390 A1 | | 11/2006 | Epaud |
| 2007/0296252 A1 | * | 12/2007 | Mattes et al. ............. 297/216.1 |
| 2008/0191540 A1 | | 8/2008 | Morris |
| 2009/0072608 A1 | | 3/2009 | Marriott et al. |

FOREIGN PATENT DOCUMENTS

WO      2008/027832 A2      3/2008

* cited by examiner

SEAT ASSEMBLY FOR A VEHICLE

CROSS-REFERENCE TO RELATED APPLICATIONS

This application is a continuation of and claims the benefit of U.S. patent application Ser. No. 12/040,181 filed Feb. 29, 2008, which claims the benefit of U.S. Provisional Application No. 60/892,543 filed Mar. 2, 2007, and U.S. Provisional Application No. 60/966,403 filed Aug. 28, 2007, all of which are incorporated by reference.

BACKGROUND OF THE INVENTION

1. Field of the Invention

The subject invention generally relates to a seat assembly for a vehicle.

2. Description of the Related Art

School buses include a seat assembly for transporting passengers and more specifically, school buses incorporate several seat assemblies into the school bus in rows. The seat assembly includes a seat bottom extending generally horizontally and a seatback coupled to the seat bottom and extending generally vertically relative to the seat bottom. In some configurations, the passengers are free to move about the school bus without being restrained in the seat assembly. In other words, the passengers are not buckled into seatbelts to restrain movement of the passengers. In seat assemblies that do not include seatbelts, federal regulatory standards require that the seatback collapse controllably forward when the passenger seated behind pitches forward and strikes the seatback such that the seatback absorbs energy from the uncontrollably moving passenger. Such an arrangement is referred to in industry as compartmentalized seating. In such a configuration, the forward rotation of the seatback is unlimited.

Recently a longstanding debate as to whether school buses should be equipped with seatbelts has intensified, with those favoring seatbelt usage on the school buses now prevailing. As a result, more and more school buses are now being equipped with seatbelt assemblies. Public pressure is building to require all school buses be equipped with seatbelt assemblies. A strong consensus has already developed requiring the seatbelt assemblies include a lap/shoulder belt combination that is selectively extendable from a retractor, similar to designs now installed in most modern automobiles.

In such a configuration, the seatbelt assembly is mounted to the seatback and the seatback remains stationary relative to the school bus in order for the seatbelt to properly lock and restrain the passenger. In other words, the retractor prevents the belt from extending from the retractor and the belt restrains the passenger in the seat assembly when the passenger's momentum urges the passenger to move relative to the seatback. However, in such a configuration, the benefits of the compartmentalized seating are lost, i.e., the seatback does not controllably collapse to absorb energy when a passenger uncontrollably moves forward and strikes the seatback. Because school buses are often used to transport children, it is foreseeable that in a school bus equipped with seatbelt assemblies that some children will buckle their seatbelts while some other children will forget or refuse to buckle their seatbelts.

It would be advantageous to develop a seat assembly wherein the seatback is capable of rotating relative to the seat bottom to absorb energy when unbuckled passengers uncontrollably move forward and strike a seatback while also mounting the seatbelt assembly in a configuration wherein the seatbelt assembly properly functions when the passenger is buckled into the seatbelt.

SUMMARY OF THE INVENTION AND ADVANTAGES

The subject invention includes a seat assembly for a vehicle. The seat assembly comprises a seat bottom and a seatback coupled to the seat bottom. The seatback is selectively rotatable relative to the seat bottom from an upright position to a forward position and the seatback includes a seatback frame. A seatbelt assembly including a retractor coupled to the seatback frame and a belt having a first end and a second end spaced from the first end. The first end is disposed in the retractor and the belt is selectively extendable from and retractable to the retractor. A guide is coupled to the seatback frame and defines an orifice with the belt slideably extending through the orifice. The retractor and the guide are fixed relative to the seatback frame and the second end of the belt is fixed to the seatback frame. The retractor, the guide, and both ends of the belt rotate from the upright position to the forward position in response to a force exerted on the seatback frame during a rapid deceleration of the seat assembly.

The subject invention also includes a seat assembly for a vehicle. The seat assembly comprises a seat bottom and a seatback coupled to the seat bottom. The seatback has a seatback frame. The seatback frame has a first edge extending along an axis and a second edge spaced from the first edge and extending along the axis and a surface extending from the first edge to the second edge defining a channel extending along the axis between the first edge and the second edge. A seatbelt assembly includes a retractor coupled to the seatback frame and a belt having a first end disposed in the retractor with the belt extending from the retractor along the axis in the channel and with the belt selectively extendable from and retractable to the retractor. A guide is spaced from the retractor and is coupled to the seatback frame and defines an orifice with the belt slideably extending from the channel through the orifice. A rigid cover has an inner surface defining a cavity receiving the seatback frame with the inner surface extending from the first edge to the second edge of the seatback frame for enclosing the belt in the channel between the retractor and the guide.

The seatback frame, the retractor, the guide, and both ends of the belt rotate together as a unit from the upright position to the forward position. The seatback frame, the retractor, the guide, and both ends of the belt rotate relative to the seat bottom in response to a force exerted on the seatback frame during a rapid deceleration of the seat assembly, e.g., when a passenger uncontrollably moves forward and strikes the seatback in front of the passenger when the vehicle is involved in a collision. The passenger's torso moves with the seatback frame as the seatback frame rotates relative to the seat bottom. When the seatback is prevented from further rotation, the momentum of the passenger belted into the seat assembly urges the passenger to continue to move forward and the seatbelt assembly is able to properly function because retractor, the guide, and both ends of the belt rotated with the seatback frame and the passenger.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
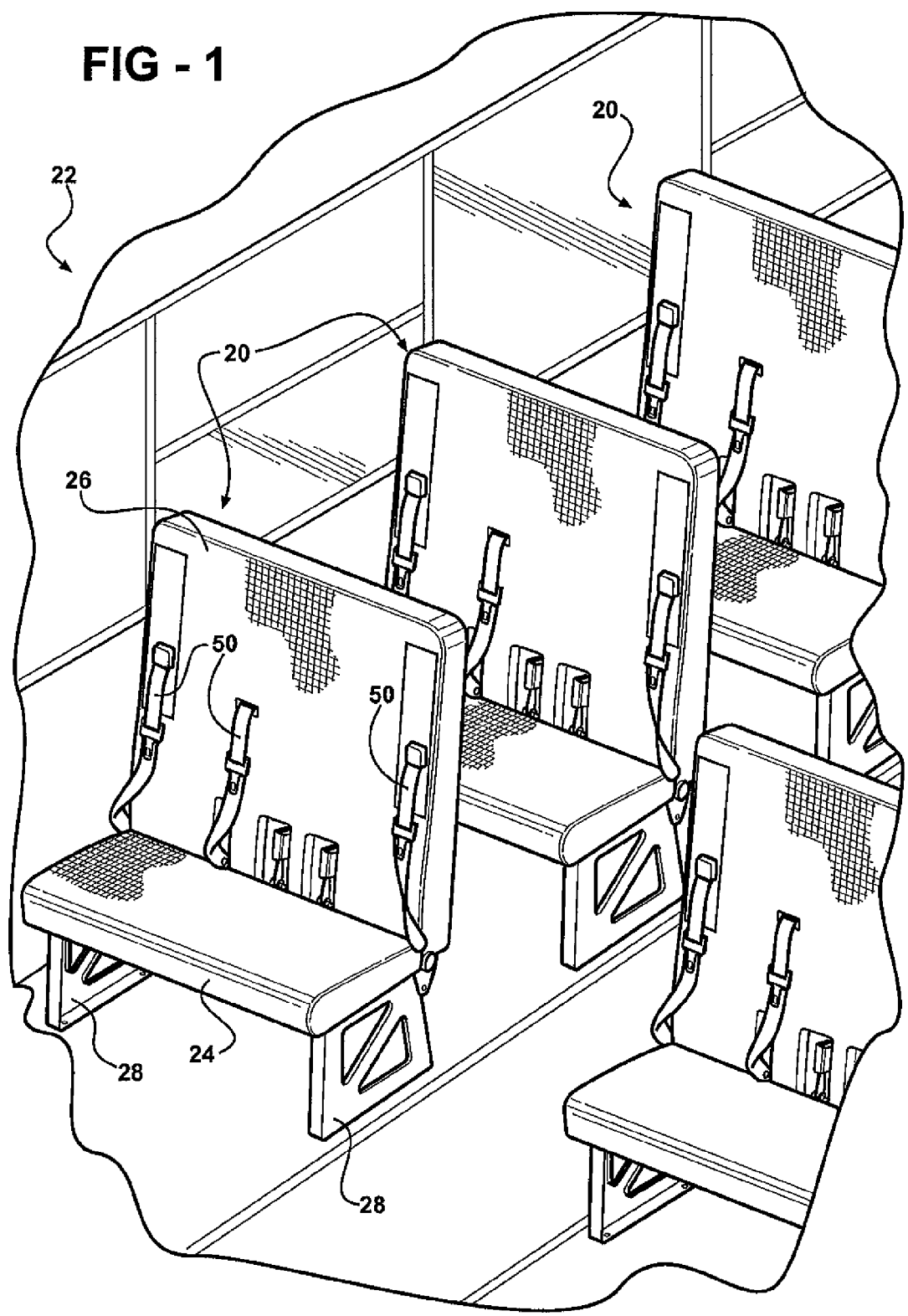
FIG. 1 is a perspective view of a plurality of seat assemblies in a vehicle.

Referring to the Figures, wherein like numerals indicate corresponding parts throughout the several views, a seat assembly is generally shown at 20. The seat assembly 20 is typically disposed in a vehicle 22 for supporting at least one passenger. In the configuration shown in FIG. 1, for exemplary purposes, the vehicle 22 is a standard school bus. Accordingly, several seat assemblies 20 are incorporated into the school bus in rows. It should be appreciated that the seat assembly 20 may be used in any type of vehicle 22 including, for example, an automobile, an airplane, and a boat.

Figure 2:
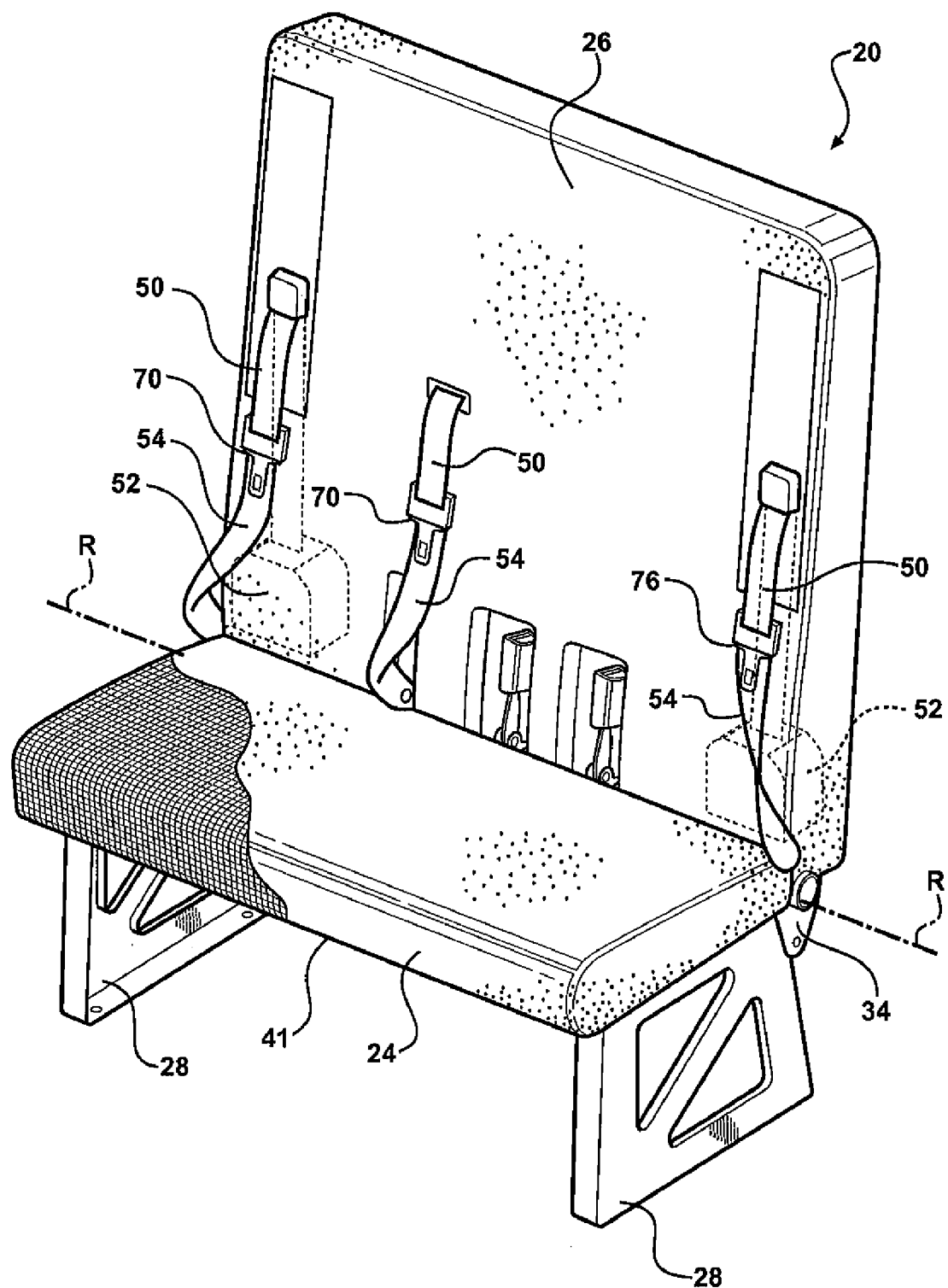
FIG. 2 is a perspective view of the seat assembly.
Figure 3:
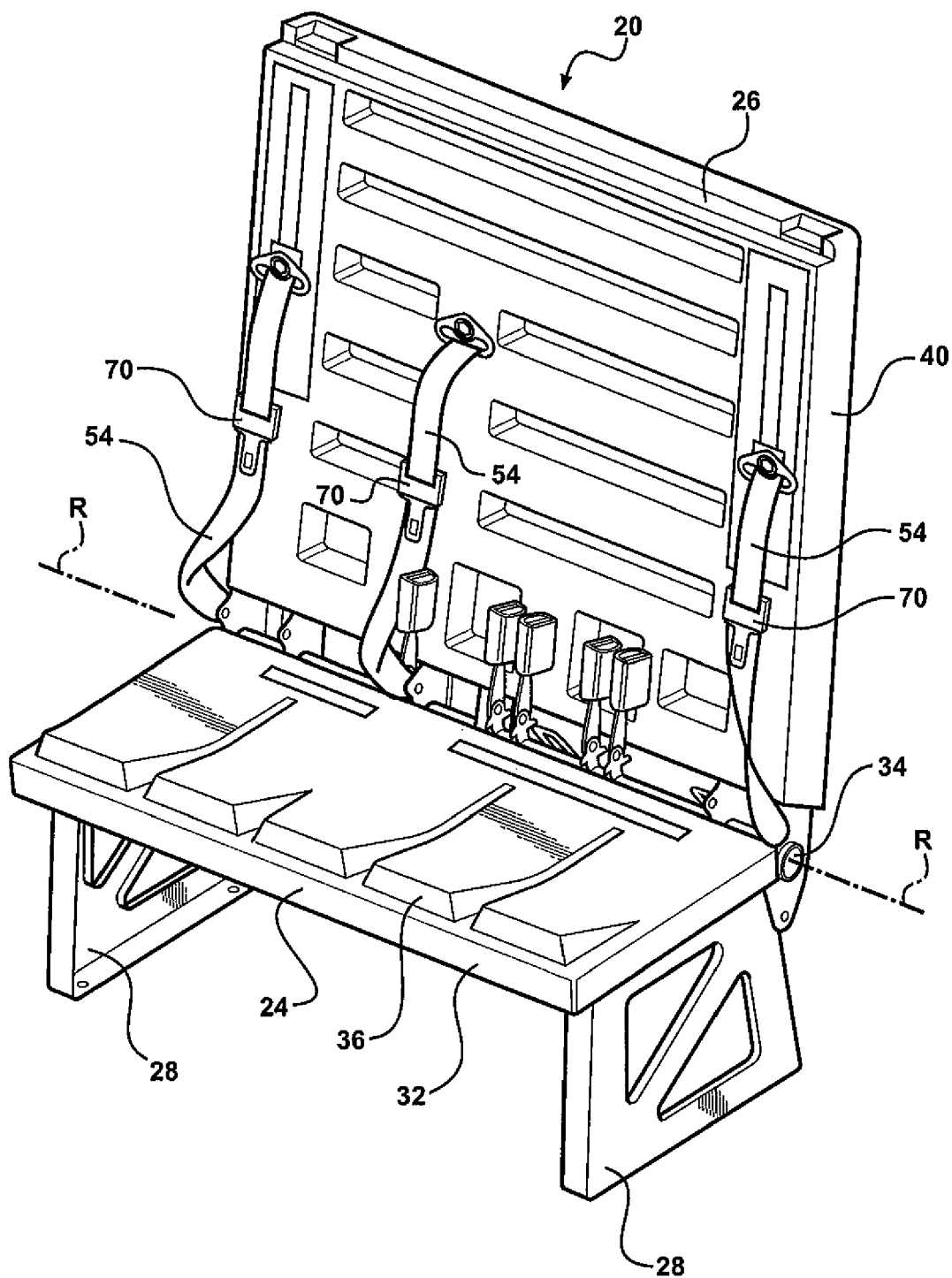
FIG. 3 is a perspective view of a portion of the seatback to show a rigid cover of the seatback and a bottom cover of the seat bottom.

As best shown in FIGS. 2 and 3, the seat assembly 20 includes a seat bottom 24 and a seatback 26 coupled to the seat bottom 24. The seat bottom 24 extends generally horizontally and the seatback 26 extends generally upwardly from the seat bottom 24. Mounting pedestals 28 are attached to and extend generally downwardly from the seat bottom 24. The mounting pedestals 28 are rigidly mounted to a floor of the vehicle 22.

Figure 4:
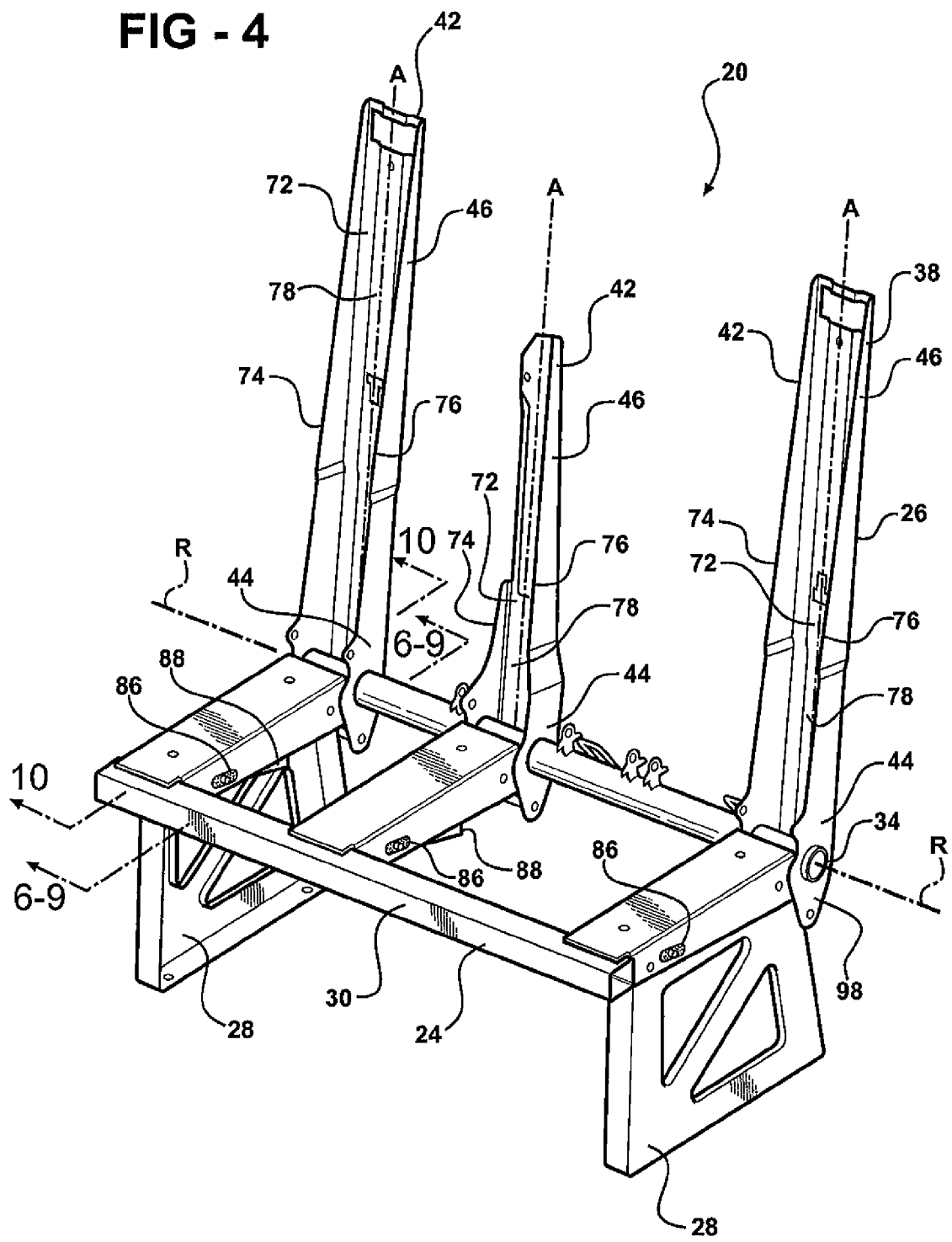
FIG. 4 is a perspective view of a portion of the seat assembly to show a seat bottom frame and a seatback frame.

As best shown in FIGS. 3 and 4, the seat bottom 24 typically includes a seat bottom frame 30 and a bottom cover 32 mounted to the seat bottom frame 30 for supporting the passenger. The seat bottom 24 includes a support rod 34 extending transverse to the seatback 26 and defining a rotational axis R for the seatback 26. The support rod 34 has a round cross-section, i.e., the support rod 34 is cylindrical. The seat bottom frame 30 is typically formed of metal, such as, for example, steel or aluminum. However it is to be appreciated that the seat bottom frame 30 may be formed of any other suitable material capable of providing the necessary support and strength.

The bottom cover 32 is typically formed of a generally planar rigid material, for example, a single sheet of thermoformed plastic. However, it should be appreciated that the bottom cover 32 may be formed of any suitable material and by any method without departing from the nature of the present invention. The bottom cover 32 can include a ramp 36 along a front edge for urging passengers of the seat assembly 20 toward the seatback 26 and to reduce the likelihood that the passenger uncontrollably moves forward and strikes the seatback 26 in front of the passenger when the vehicle 22 is stopped abruptly, i.e., also referred to in industry as "submarining."

As best shown in FIGS. 6-9, the seatback 26 is selectively rotatable relative to the seat bottom 24 about the rotational axis R. As described below, the amount of rotation and the amount of force required to achieve rotation is dependent upon an energy absorbing device coupled to the seatback 26 and the seat bottom 24. When the vehicle 22 is abruptly stopped, such as during a collision, the passengers typically uncontrollably move forward under their own momentum. As described below, the energy absorbing device allows for limited rotation of the seatback 26 about the seat bottom 24 to absorb energy from the uncontrollably moving passenger and provides a hard stop to prevent further rotation of the seatback 26.

Figure 6:
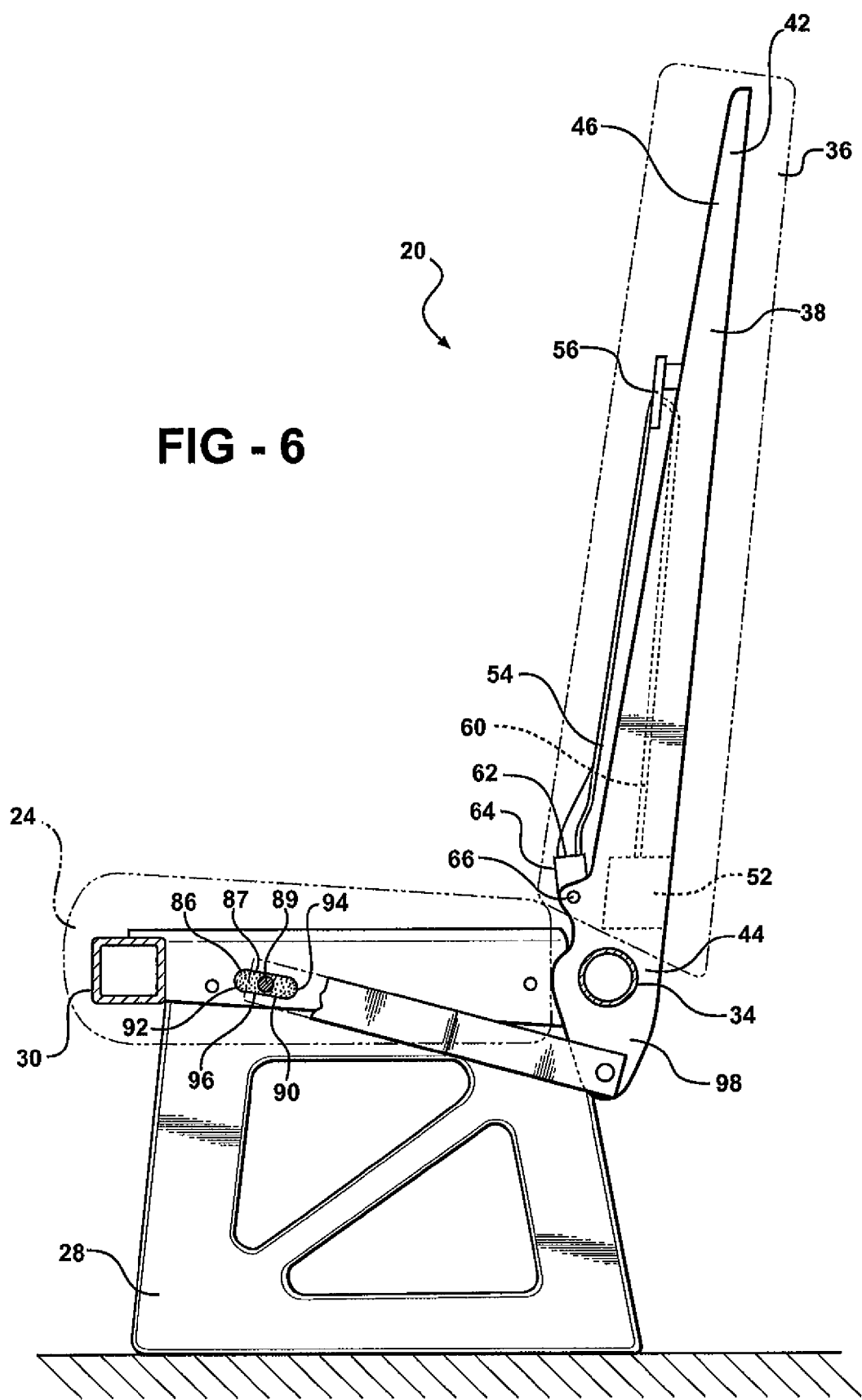
FIG. 6 is a cross-sectional view along line 6-9 of FIG. 4 when the seatback in an upright position.
Figure 7:
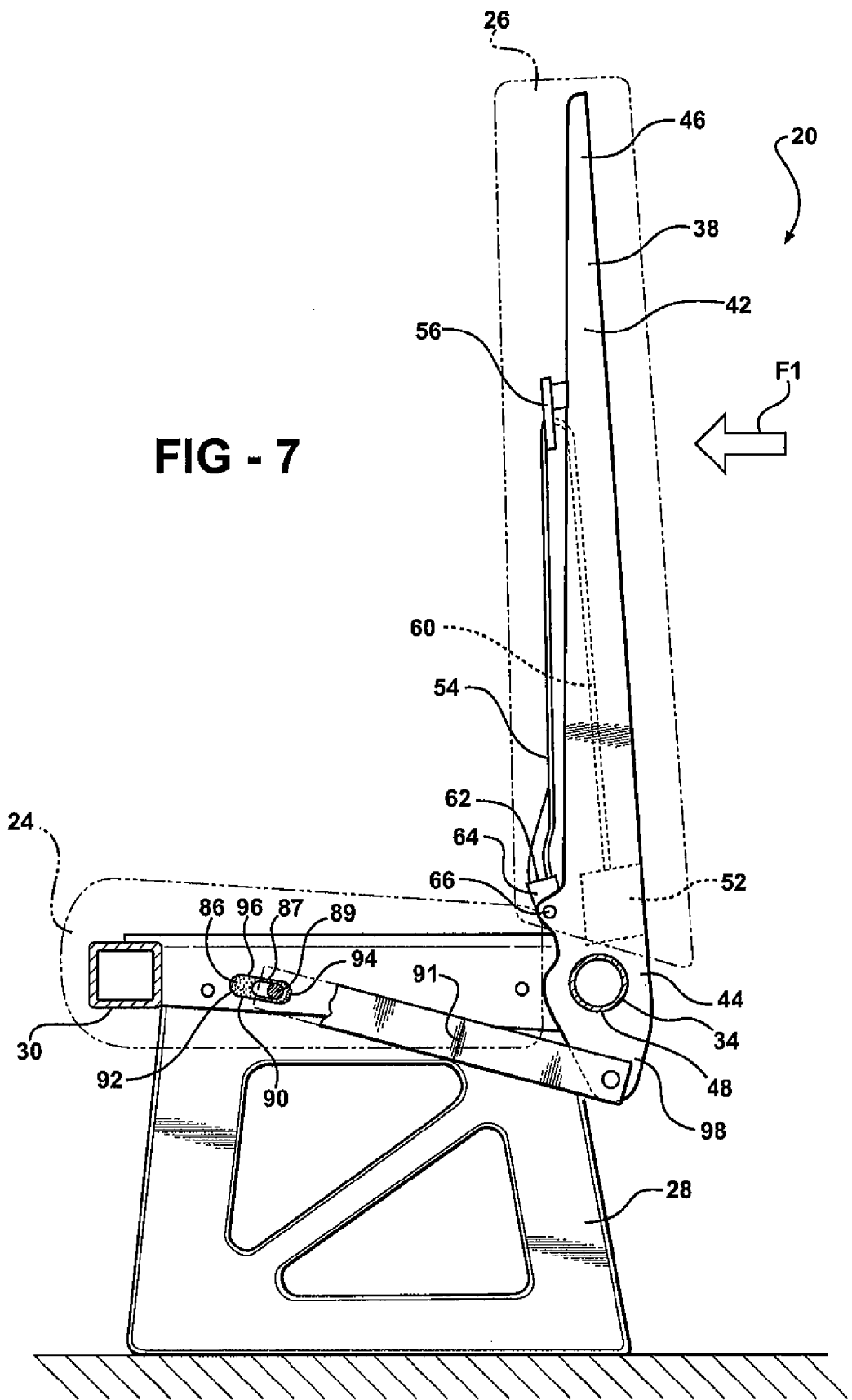
FIG. 7 is a cross-sectional view along line 6-9 of FIG. 4 when the seatback in an intermediate position.
Figure 8:
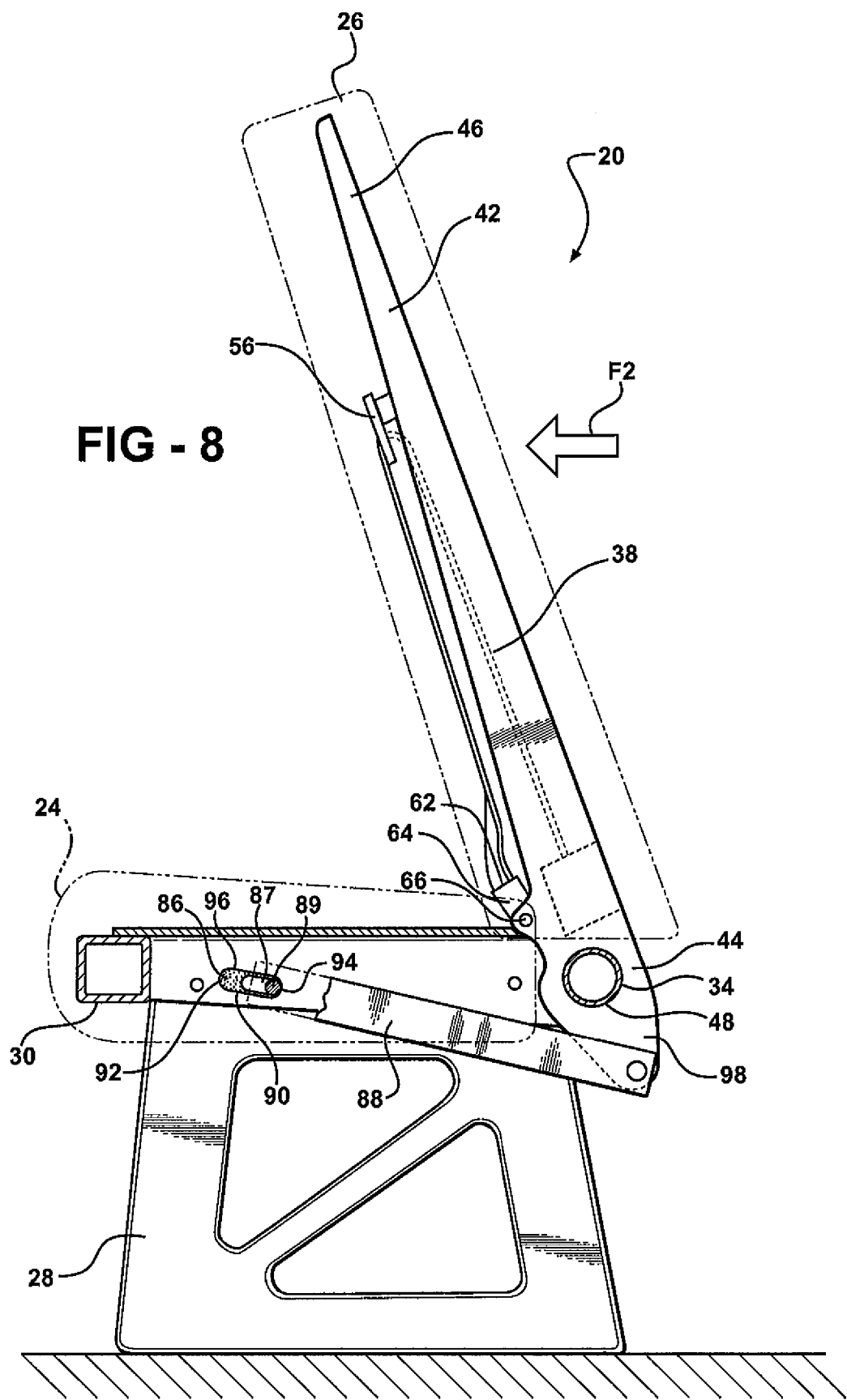
FIG. 8 is a cross-sectional view along line 6-9 of FIG. 4 when the seatback in a forward.

The seatback 26 is shown in the upright position in FIG. 6. As shown in FIG. 7, the seatback 26 is rotatable in a first direction about the rotational axis R from the upright position to an intermediate position when applying an intermediate force F1 to the seatback 26. The intermediate force F1 is represented by an arrow in FIG. 7. The intermediate force F1 can be, for example, a result of a passenger uncontrollably moving forward and striking the seatback 26 in front of the passenger in response to a front-end collision of the vehicle 22. As shown in FIG. 8, the seatback 26 is also rotatable in the first direction about the rotational axis R to a forward position when applying to the seatback 26 a predetermined force F2 that is greater than the intermediate force F1. The predetermined force F2 is represented by an arrow in FIG. 8. As with the intermediate force F1, the predetermined force F2 can be, for example, a result of a passenger uncontrollably moving forward and striking the seatback 26 in front of the passenger in response to a front-end collision. It should be appreciated that the term "intermediate force" and the term "predetermined force" are used to delineate between forces of different magnitude. As shown in FIGS. 7 and 8, both the intermediate force F1 and the predetermined force F2 act in the same direction on the seatback 26.

As best shown in FIGS. 3 and 4, the seatback 26 includes a seatback frame 38 and a rigid cover 40. The rigid cover 40 is described further below. In the configuration shown in the figures, the seatback frame 38 is further defined as at least one tower 42 extending upwardly from the seat bottom. In the configuration shown in the figures, the seatback frame 38 includes three towers 42 spaced from each other along the seat bottom 24 with two of the towers 42 disposed on opposing ends of the support rod 34 and one of the towers 42 disposed on the support rod 34 approximately ⅓ of a distance from one to the other of the opposing ends.

As best shown in FIGS. 4-9, each tower 42 rigidly extends between a proximate portion 44 coupled to the seat bottom 24 and a distal portion 46 spaced from the proximate portion 44. Each tower 42 is coupled to the support rod 34 at the proximate portion 44 and is supported by the support rod 34 at the proximate portion 44. Specifically, each tower 42 defines a round hole 48 configured to rotatably receive the support rod 34 and the support rod 34 extends through the round hole 48 of each tower 42.

The distal portion 46 of each of the towers 42 is spaced from the distal portion 46 of each of the other towers 42. As described below, the rigid cover 40 rigidly couples the towers 42 together. In such a configuration, a cross-bar connecting each of the distal portions 46 is not necessary, thus reducing the weight and the material cost of the seatback frame 38. However, it should be appreciated that the seatback frame 38 can include a cross-bar extending between the towers 42 without departing from the nature of the present invention.

Figure 5:
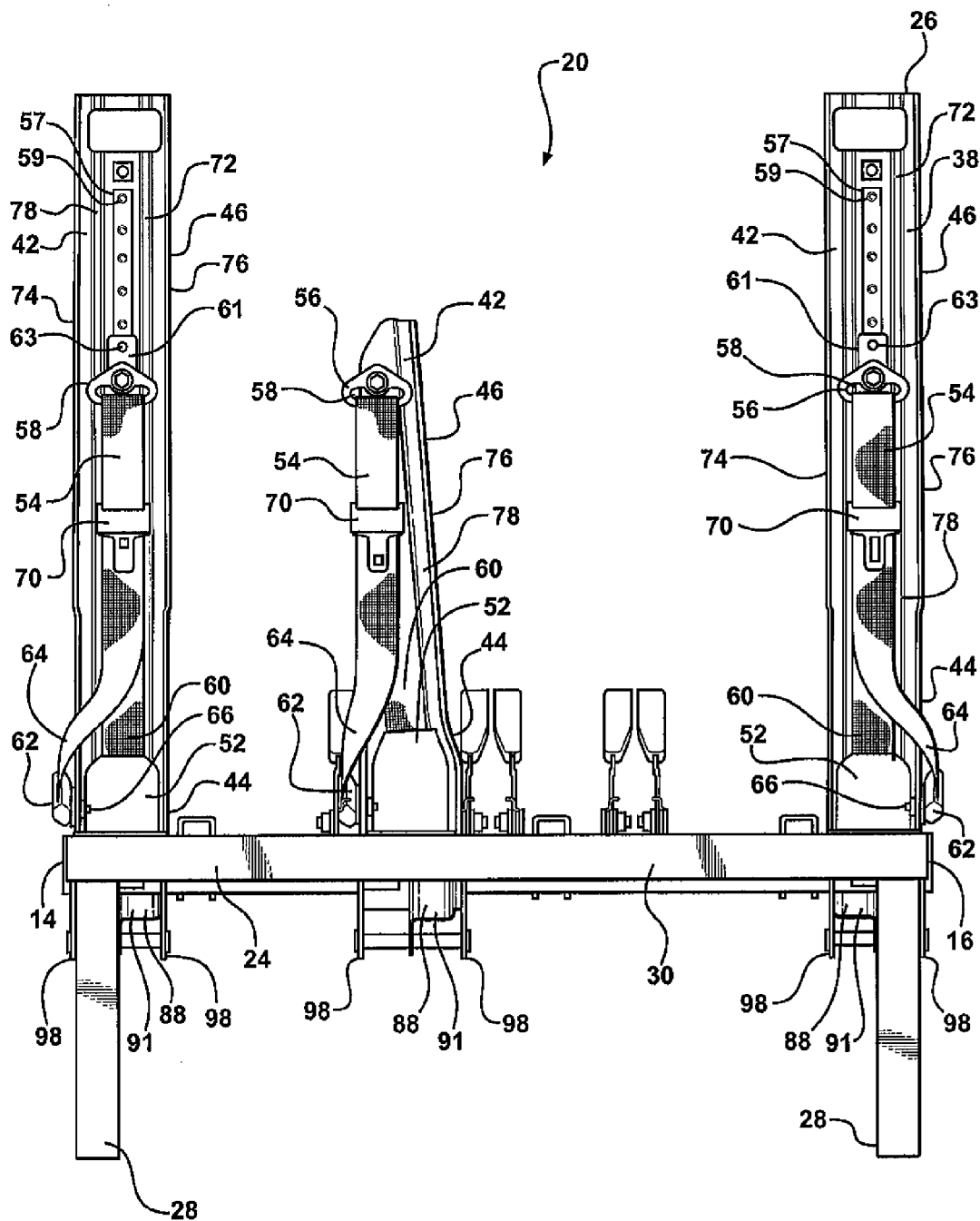
FIG. 5 is a front view of a seatback frame with a plurality of seatbelt assemblies to the seatback frame.

As shown in FIGS. 1-3 and 5, the seat assembly 20 includes a plurality of seatbelt assemblies 50. As best shown in FIG. 5, each seatbelt assembly 50 includes a retractor 52 coupled to the seatback frame 38 and a belt 54 extending from the retractor 52. As will be apparent from the description below, the seatbelt assemblies 50 are those which are commonly referred to as a "three-point seatbelt assemblies," i.e., when restraining a passenger, the belt 54 extends from the passenger's shoulder, across the passenger's torso to one side of the passenger's lap, and across the passenger's lap to the other side of the passenger's lap. In such a configuration, the belt 54 is fixed at three points: the passenger's shoulder, one side of the passenger's lap, and the other side of the passenger's lap. However, it should be appreciated that one or more of the seatbelt assemblies 50 can be a type of seatbelt assembly different than the "three-point seatbelt assembly" without departing from the nature of the present invention.

A guide 56, also referred to in industry as an adjustable turning loop, is coupled to the seatback frame 38 and, specifically, is selectively fixed to the proximate portion 44 of the seatback frame 38. As described below, the guide 56 is selectively moveable between fixed positions along the seatback frame 38. The guide 56 defines an orifice 58 and the belt 54 slideably extends through the orifice 58.

As best shown in FIGS. 5-9, the belt 54 has a first end 60 and a second end 62 spaced from the first end 60. The first end 60 is disposed in the retractor 52 and the belt 54 is selectively extendable from and retractable to the retractor 52. As appreciated by one skilled in the art, the belt 54 is extendable from and retractable to the retractor 52 under normal operating conditions and the retractor 52 locks the belt 54 to prevent extension from the retractor 52 during an abrupt stop by the vehicle 22 to restrain the passenger in the seat assembly 20.

Both the retractor 52 and the second end 62 of the belt 54 are fixed to the proximate portion 44 of the seatback frame 38. The belt 54 extends upwardly from the retractor 52 to the guide 56, through the orifice 58 of the guide 56, and downwardly from the guide 56 to the proximate portion 44.

The retractor 52, the guide 56, and both ends 60, 62 of the belt 54 rotate from the upright position to the forward position in response to a force, e.g., the intermediate force F1 or the predetermined force F2, exerted on the seatback frame 38 during a rapid deceleration of the seat assembly 20. In other words, during an abrupt stop by the vehicle 22, e.g., during a front-end collision, the seatback frame 38 rapidly decelerates and a passenger sitting behind the seatback 26 can uncontrollably move forward and strike the seatback 26 with the intermediate or predetermined forces F1, F2. In such a scenario, the tower 42 rotates about the support rod 34 and the seatbelt assembly 50 rotates with the tower 42 thereby allowing the seatbelt assembly 50 to properly function to retain the passenger in the seat assembly 20.

The belt 54 includes a rigid sleeve 64 fixed to the second end 62 of the belt 54. The rigid sleeve 64 is fixed to the tower 42. Specifically, the proximate portion 44 of the tower 42 presents a weld stud 66 and the rigid sleeve 64 defines an aperture that receives the weld stud 66 to fix the rigid sleeve 64 to the tower 42. It should be appreciated that the rigid sleeve 64 and the corresponding aperture are exemplary and the second end 62 of the belt 54 can be fixed to the tower 42 in any fashion without departing from the nature of the present invention.

As shown in FIGS. 1-3, 5, and 11-12, the seat assembly 20 includes at least one buckle 68 for each seatbelt assembly 50 and each seatbelt assembly 50 includes a clip 70 for engaging the respective buckle 68 to restrain a passenger in the seat assembly 20. Each of the buckles 68 is coupled to the seat bottom frame 30. More particularly with reference to the figures, the buckles 68 are mounted to the support rod 34 of the seat bottom frame 30. The arrangement of the buckles 68 is discussed further below. As appreciated by one skilled in the art, the clips 70 are selectively engageable and disengageable with the respective buckle 68.

As shown in FIGS. 5-10, each tower 42 defines a channel 72 with the belt 54 extending from the retractor 52 to the guide 56 in the channel 72. Specifically, each tower 42 has a first edge 74 extending along an axis A, a second edge 76 spaced from the first edge 74 and extending along the axis A, and a surface 78 extending from the first edge 74 to the second edge 76 defining the channel 72 between the first edge 74 and the second edge 76. As shown in the figures, each tower 42 is generally U-shaped in cross-section; however, it should be appreciated that the channel 72 can have a different shape such that the cross-section of the tower 42 can have any shape without departing from the nature of the present invention.

Such a configuration with the belt 54 extending in the channel 72 reduces or eliminates lateral forces exerted on the respective tower 42 when the force is exerted on the belt 54, i.e., when the retractor 52 locks the belt 54 and retains a passenger during an abrupt stop by the vehicle 22. Specifically, the guide 56 and the retractor 52 are disposed along the axis of the tower 42 such that when force is exerted on the belt 54, the force is transmitted to the tower 42 along the axis A such that the tower 42 rotates about the support rod 34. Because the force is transmitted to the tower 42 along the axis A, lateral forces are reduced or eliminated, i.e., the force does not exert a twisting motion to the tower 42. Because the lateral forces are reduced or eliminated, the thickness of the towers 42 may be reduced, which is advantageous with respect to weight, cost to manufacture, and packaging.

As mentioned above, the rigid cover 40 rigidly couples the towers 42 to each other. In other words, the rigid cover 40 structurally reinforces the towers 42 and ties together the towers 42 to reinforce the seatback 26. As the seatback 26 rotates about the support rod 34, the rigid cover 40 causes each of the towers 42 to rotate together about the support rod 34. In addition, as described above, because the rigid cover 40 rigidly couples the towers 42 together, a cross-bar connecting each of the distal portions 46 of each tower 42 is not necessary, thus reducing the weight and the material cost of the seatback frame 38.

Figure 10:
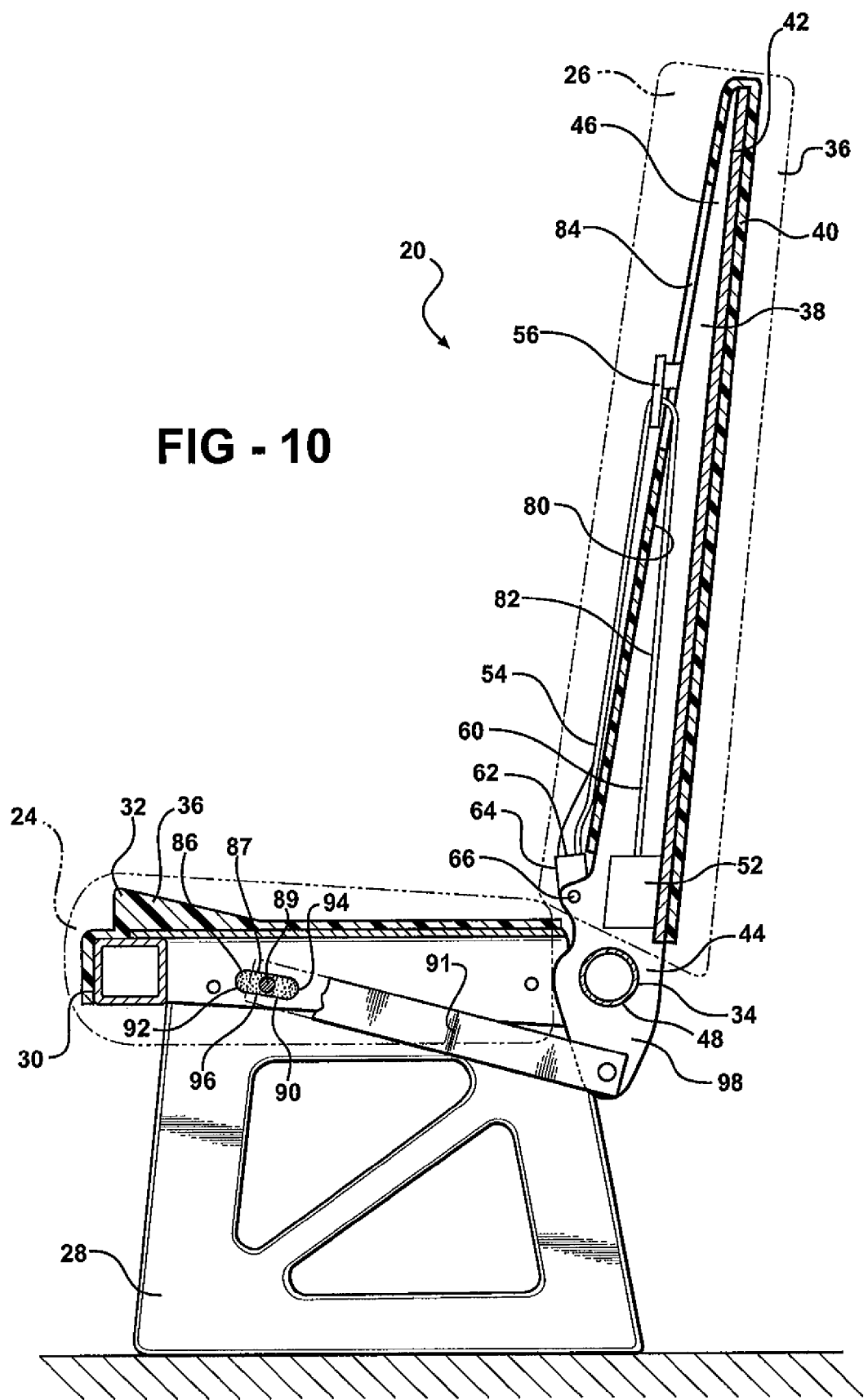
FIG. 10 is a cross-sectional view along line 10 of FIG. 4 showing the interaction of the rigid cover and the seatback frame.

As best shown in FIG. 10, the rigid cover 40 of the seat assembly 20 has an inner surface 80 defining a cavity 82. The cavity 82 receives each of the towers 42. The rigid cover 40 is typically formed of a generally planar rigid material and provides a surface for the passengers to rest their back against. For example, the rigid cover 40 is typically formed of plastic and is typically formed by injection molding. However, it should be appreciated that the rigid cover 40 may be formed of any suitable material and by any method without departing from the nature of the present invention.

The inner surface 80 of the rigid cover 40 extends from the first edge 74 to the second edge 76 of the tower 42, and specifically, the inner surface 80 of the rigid cover 40 contacts the first and second edges 74, 76 of the tower 42. The rigid cover 40 encloses the belt 54 in the channel 72 between the retractor 52 and the guide 56 to prevent the belt 54 from rubbing on the first and/or second edge 74, 76 of the tower 42 as the belt 54 extends from and to the retractor 52 thereby reducing wear on the belt 54.

The rigid cover 40 defines an opening 84 extending along the axis A of the tower 42. The belt 54 extends from the guide 56 through the opening 84. As described further below, the guide 56 is selectively moveable along the opening 84.

The seatback 26 is assembled by attaching the retractor 52 and the guide 56 to the tower 42. The belt 54 is extended from the retractor 52 in and along the channel 72 and through the guide 56. The tower 42 is then inserted into the rigid tower 42 and the second end 62 of the belt 54 is pulled through the opening 84 of the rigid cover 40. The second end 62 of the belt 54 is then attached to the proximate portion 44 of the tower 42.

As best shown in FIGS. 6-9, the energy absorbing device of the seat assembly 20 includes an energy absorbing member 86 for allowing rotation of the seatback 26 relative to the seat bottom 24 from the upright position to the intermediate position and a stopping member 88 for allowing rotation of the seatback 26 from the intermediate position to the forward position. The stopping member 88 prevents further rotation of the seatback frame 38 beyond the forward position.

The seatback 26 on which the passenger rests against must provide adequate support such that the seatbelt assembly 50 locks and restrains the passenger against the seat bottom and the seatback 26. In other words, when the vehicle 22 abruptly stops, the passenger's momentum urges the passenger forward and the passenger must move forward relative to the seatback 26 and the seatbelt assembly 50 in order for the seatbelt assembly 50 to lock and prevent the belt 54 from extending from the retractor 52. The energy absorbing device limits the rotation of the seatback 26 about the rotational axis R, i.e., provides a hard stop, in order for the seatbelt assembly 50 to properly function and stop the passenger from uncontrollably moving forward. However, some passengers may refuse or forget to buckle their seatbelt assembly 50, i.e., engage the clip 70 in the buckle 68 with the belt 54 extending across the passenger. In such a situation, when the vehicle 22 is abruptly stopped, the passenger may uncontrollably move forward and strike the seatback 26 in front of the passenger. The energy absorbing device allows the limited rotation of the seatback 26 about the rotational axis R to absorb energy from such passengers. Thus, the energy absorbing device absorbs energy when the passenger uncontrollably strikes the seatback 26 in front of the passenger while also providing a hard stop to allow the seatbelt assembly 50 to function properly.

The energy absorbing member 86 is mounted to a slot 90 defined in the seat bottom frame 30. Specifically, the slot 90 includes a first end portion 92 and a second end portion 94 facing each other in a spaced relationship. The slot 90 defines a middle portion 96 disposed between the first and second end portions 94. The middle portion 96 is defined by an upper surface and a lower surface facing each other in a spaced relationship. The upper and lower surfaces extend from the first end portion 92 to the second end portion 94. Preferably the slot 90 defines an oval configuration. However it is to be appreciated that the slot 90 may define a circular configuration, a rectangular configuration, a square configuration or any other suitable configuration.

The energy absorbing member 86 is further defined as a bushing and is formed of elastomeric material. For example, the energy absorbing member 86 is formed of a thermoplastic elastomeric material, such as a thermoplastic polyester elastomeric material, e.g., that available under the trade name Hytrel® which is commercially available from E. I. du Pont de Nemours and Company. As discussed below, the elastomeric material allows the energy absorbing member 86 to elastically compress when applying the intermediate force to the seatback 26 and to uncompress when the intermediate force is released, i.e., the energy absorbing member 86 returns to its original configuration. The energy absorbing member 86 is reusable in such situations.

The energy absorbing member 86 is typically press fit into the slot 90 and abuts the first and second end portions 94, 96 and the upper and lower surfaces of the slot 90. However it is to be appreciated that the energy absorbing member 86 may be mounted to the slot 90 in any suitable manner.

The stopping member 88 is coupled to the seatback frame 38 and to the seat bottom 24 and extends from the energy absorbing member 86 to the seatback frame 38. The stopping member 88 is attached to the energy absorbing member 86. Specifically, the stopping member 88 is coupled to the seat bottom 24 through the slot 90 and through the energy absorbing member 86. The seatback frame 38 presents at least one extension 98 extending downwardly from the seat bottom 24 and the stopping member 88 is coupled to the extension 98. In the configuration shown in the figures, the seatback frame 38 presents a pair of extensions 98 spaced from each other. A rod extends between the pair of extensions 98 of each respective tower 42. The rod is disposed through the second energy absorbing member 86 with the rod attached to the pair of extensions 98. It should be appreciated that the stopping member 88 may be connected to the extension 98 in any manner, for example, by bolting or pinning, without departing from the nature of the present invention.

The stopping member 88 is further defined as a strap. The stopping member 88 acts as a linkage that maintains the seatback 26 in the upright position when no external force is being applied to the seatback 26. The stopping member 88 is typically formed of metal such as, for example, steel. In such a configuration, the steel is, for example, ⅜ inches thick. However it is to be appreciated that the second energy absorbing member 86 may have various thicknesses and widths as known to those of ordinary skill in the art. For example, as the thickness of the second energy absorbing member 86 increases, the width of the second energy absorbing member 86 may decrease. As another example, as the width of the second energy absorbing member 86 increases, the thickness of the second energy absorbing member 86 may decrease.

The stopping member 88 moves along the slot 90 as the seatback frame 38 rotates from the upright position toward the forward position. The stopping member 88 compresses the energy absorbing member 86 as the stopping member 88 moves along the slot 90. Specifically, the energy absorbing member 86 defines an aperture 87 through the middle portion 96 of the slot 90 when the seatback 26 is in the upright position. The stopping member 88 further includes a pin 89 disposed in the slot 90. The pin 89 extends from the stopping member 88 into the aperture 87 of the energy absorbing member 86. The pin 89 abuts the energy absorbing member 86.

As described further below, the pin 89 is movable in the slot 90 toward the first end portion 92 of the slot 90 during application of the intermediate and predetermined forces F1, F2 to the seatback 26. The energy absorbing member 86 elastically compresses to absorb energy when the pin 89 moves toward the first end portion 92 of the slot 90 as the seatback 26 rotates to the intermediate position.

The stopping member 88 defines at least bend 91, i.e., kink. The bend 91 maintains a predetermined configuration when the seatback 26 rotates to the intermediate position. As discussed below, the bend 91 deforms when the seatback 26 rotates to the forward position for absorbing energy. Once the bend 91 deforms when in the forward position, a hard stop is created for preventing additional rotation of the seatback 26 about the rotational axis R which allows the seatbelt assembly 50 to lock, i.e. function properly. Specifically, the bend 91 deforms such that the stopping member 88 is straight to prevent further rotation of the seatback 26. It is to be appreciated that the bend 91 may be in any configuration for absorbing energy, such as one bend, a plurality of bends, etc.

As such, if the passenger uncontrollably moves forward and impacts the seatback 26 of the seatback 26 in front of the passenger, the seatback 26 in front of the passenger rotates forward to absorb energy from the passenger. In such a situation, if the force on the seatback 26 reaches the predetermined force, the bend 91 in the stopping member 88 is straightened thereby providing some flexibility to the seatback 26 relative to the support platform. However, when the bend 91 is straightened, the stopping member 88 prevents further rotation of the seatback 26 relative to the support platform thereby providing a hard stop such that the seatbelt assembly 50 of the rotating seat may properly function.

The energy absorbing member 86 has a rigidity and the stopping member 88 has a rigidity greater than the rigidity of the energy absorbing member 86. As such, the energy absorbing member 86 absorbs energy when the seatback 26 moves to the intermediate position and the stopping member 88 absorbs energy when the seatback 26 moves to the forward position.

For illustrative purposes, a discussion of the seatback 26 moving from the upright position to the intermediate and forward positions with the corresponding movement of the energy absorbing member 86 and the stopping member 88 is set forth below. Only one set of the energy absorbing member 86 and stopping member 88 are shown in FIGS. 6-9; however it is to be appreciated that this discussion applies to each of the energy absorbing member 86 and stopping member 88 coupled to each of the tower 42s. Referring to FIG. 6, when no forces are applied to the seatback 26, the seatback 26 is disposed in the upright position and the pin is at rest and disposed along the middle portion of the respective slot 90.

Referring to FIG. 7, the intermediate force F1 is applied to the seatback 26, which rotates the seatback 26 about the rotational axis R toward the seat bottom to the intermediate position. The pair of extensions 98 of the tower 42 rotates away from the seat bottom which causes the energy absorbing member 86 to move with the towers 42. The pin 89 moves in the respective slot 90 toward the first end portion 92 to compress the energy absorbing member 86 between the pin 89 and the first end portion 92 of the slot 90. It is to be appreciated that the pin 89 may move downwardly toward the lower surface of the slot 90 as the pin 89 moves toward the first end portion 92 due to the energy absorbing member 86 angling away from the seat bottom 24. It is to be further appreciated that the pin 89 may move upwardly toward the upper surface of the slot 90 as the pin 89 moves toward the first end portion 92 in a configuration where the energy absorbing member 86 angles upwardly toward the seat bottom 24. The pin 89 compresses the respective energy absorbing member 86 for absorbing energy without the energy absorbing member 86 absorbing energy, i.e., the energy absorbing member 86 is compressed and the stopping member 88 does not deform. When the predetermined force F2 is released, the energy absorbing member 86 uncompresses and moves the pin 89 back to the middle portion 96 while the seatback 26 returns to the upright position.

Referring to FIG. 8, the predetermined force F2 is applied to the seatback 26 which rotates the seatback 26 about the rotational axis R toward the seat bottom 24 to the forward position. The predetermined force F2 rotates the seatback 26 closer to the seat bottom 24 than when the intermediate force F1 is applied. In other words, the seatback 26 moves through the intermediate position to the forward position. The first and second extensions 98 of the respective tower 42 rotate away from the seat bottom 24 which causes the stopping member 88 to move with the tower 42. The pin 89 moves in the respective slot 90 toward the first end portion 92 of the slot 90 to the intermediate position. The pin 89 compresses the respective energy absorbing member 86 between the pin 89 and the first end portion 92 of the slot 90 for absorbing energy. As the pin 89 continues to move, the energy absorbing member 86 is frangible and the pin 89 breaks through the energy absorbing member 86 such that the pin 89 abuts or engages the first end portion 92 when in the second position. It is to be appreciated that the energy absorbing member 86 absorbs energy as the pin 89 breaks through the energy absorbing member 86. However, once the pin 89 engages the first end portion 92, the energy absorbing member 86 does not absorb more energy. When the pin 89 engages the first end portion 92 in the forward position, the bend 91 in the stopping member 88 deforms or straightens out for absorbing additional energy. Once the bend 91 deforms, a hard stop is created for preventing additional rotation of the seatback 26 about the rotational axis R which allows the seatbelt assembly 50 to lock, i.e. function properly. When the predetermined force F2 is eliminated, the energy absorbing member 86 and the stopping member 88 are typically replaced with replacement first energy absorbing and stopping members. It is to be appreciated that the seat assembly 20 may be replaced with a new seat assembly 20 when the predetermined force F2 is applied.

Figure 9:
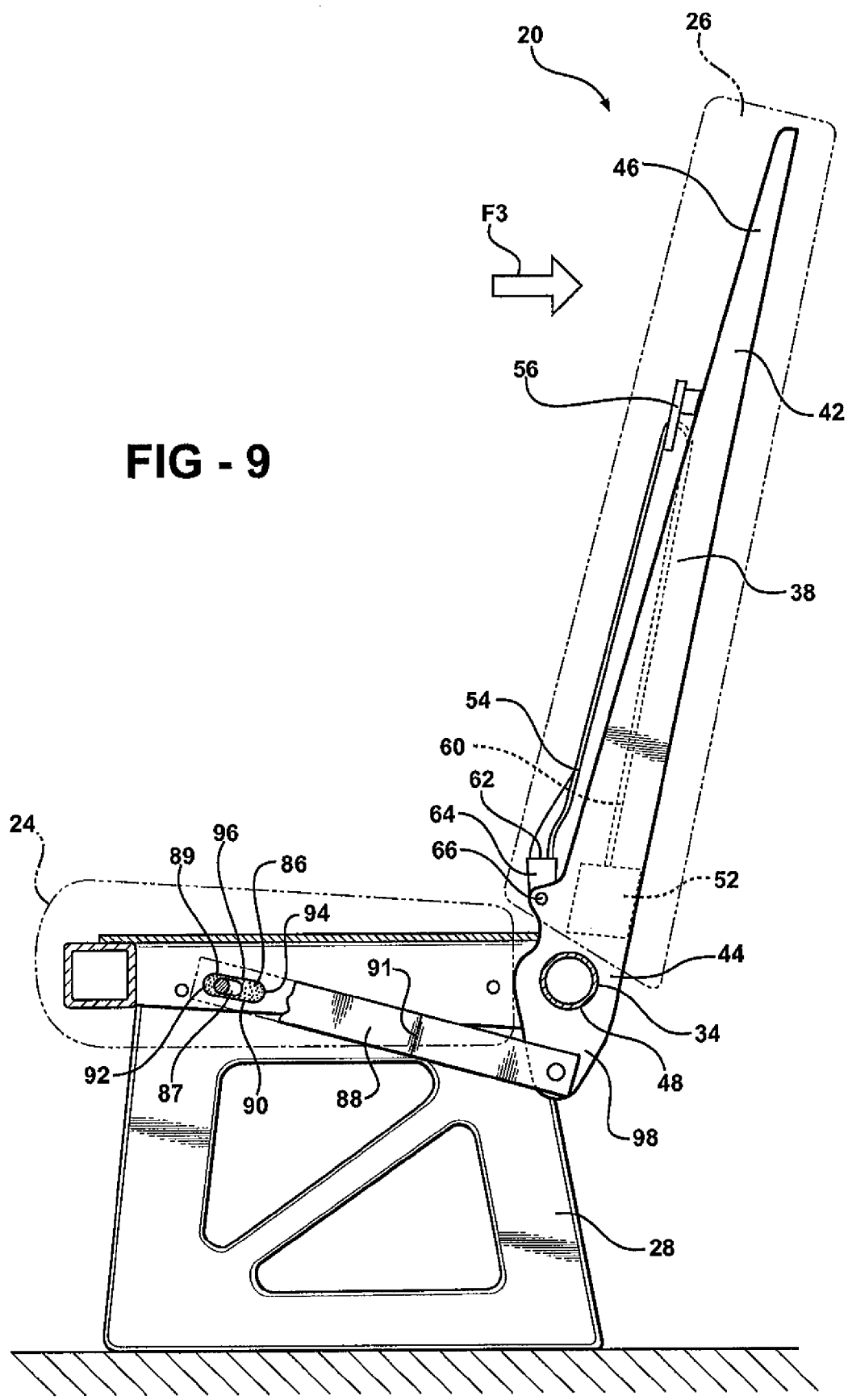
FIG. 9 is a cross-sectional view along line 6-9 of FIG. 4 when the seatback in an inclined position.

In addition, the seatback 26 is rotatable to an inclined position in response to a rearward force F3, as shown in FIG. 9. Specifically, the seatback 26 is rotatable in a second direction opposite the first direction when applying the rearward force F3 to the seatback 26. The rearward force F3 is represented by an arrow in FIG. 9. The rearward force F3 can be, for example, a result of a passenger leaning back against the seatback 26 during a rear-end collision of the vehicle. When the seatback 26 rotates to the inclined position, the pin 89 moves along the slot 90 from the middle portion 96 toward the second end portion 94 of the slot 90. The energy absorbing member 86 elastically compresses as the pin 89 moves toward the second end portion 94 and uncompresses as the pin 89 moves away from the second end portion 94 toward the middle portion 96.

In the configuration described above and shown in the figures, the energy absorbing member 86 is mounted to the seat bottom frame 30 and the stopping member 88 extends from the energy absorbing member 86 to the seatback frame 38. However, it should be appreciated that the energy absorbing member 86 can be mounted to the seatback frame 38 with the stopping member 88 extending from the energy absorbing member 86 to the seat bottom frame 30 without departing from the nature of the present invention.

The guide 56 is selectively moveable between fixed positions along the seatback frame 38. In the embodiment shown in the Figures, the seatback frame 38 defines a track 57 and a plurality of indentations 59 along the track 57. The guide 56 includes a slider 61 slideably engaging the track 57 and a shaft 63 selectively engageable with the indentations 59 for fixing the guide 56 at the fixed position along the seatback frame 38. It should be appreciated the embodiment including the indentations 59 along the track 57 is exemplary and that the movement of the guide 56 along the seatback frame 38 can be accomplished in any fashion without departing from the nature of the present invention. For example, the guide 56 can be adjustable along an infinite number of positions along the seatback frame 38 and can be maintained in any of the infinite number of positions by frictionally engaging the seatback frame 38.

Figure 11:
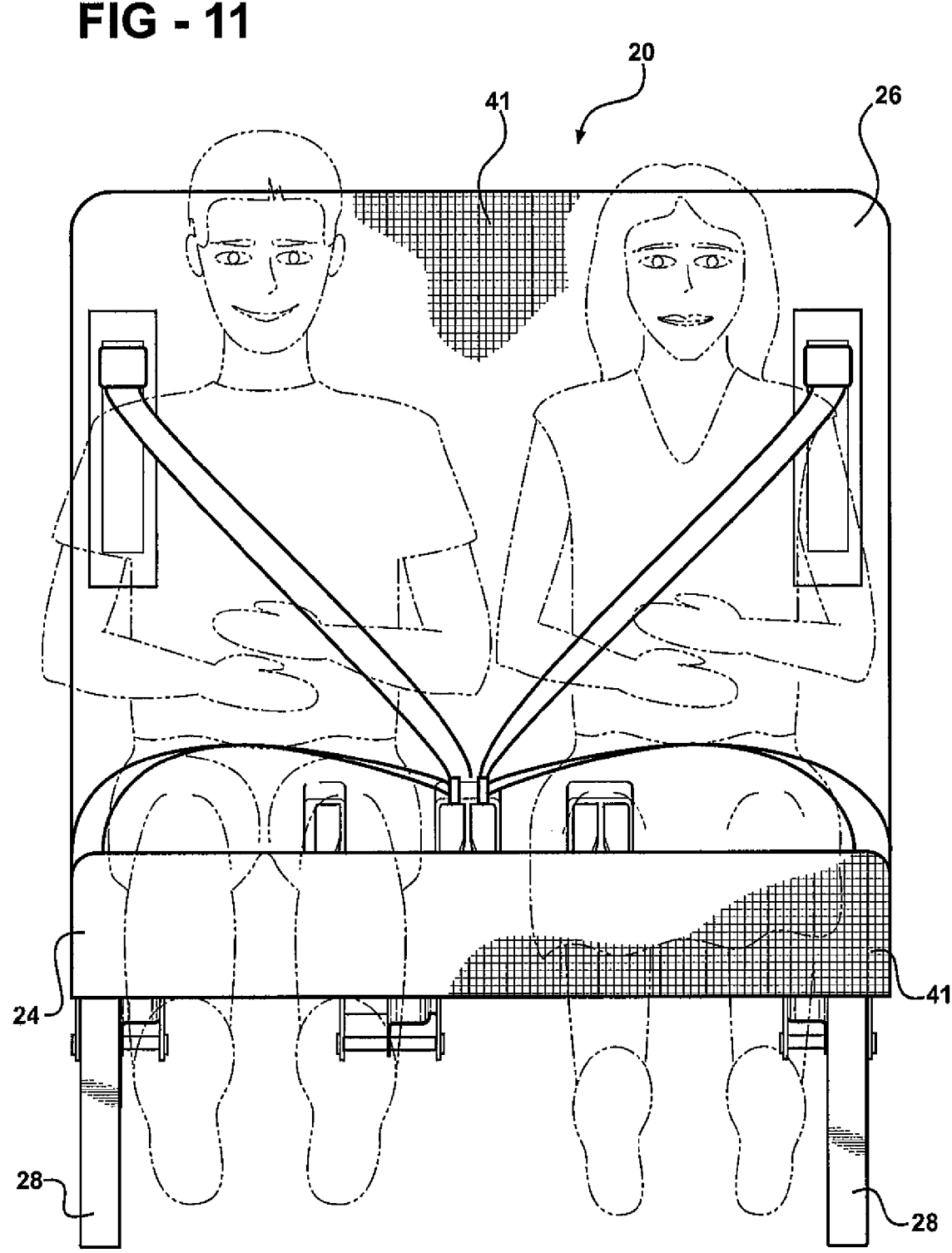
FIG. 11 is a front view of the seat assembly configured in a two passenger configuration.
Figure 12:
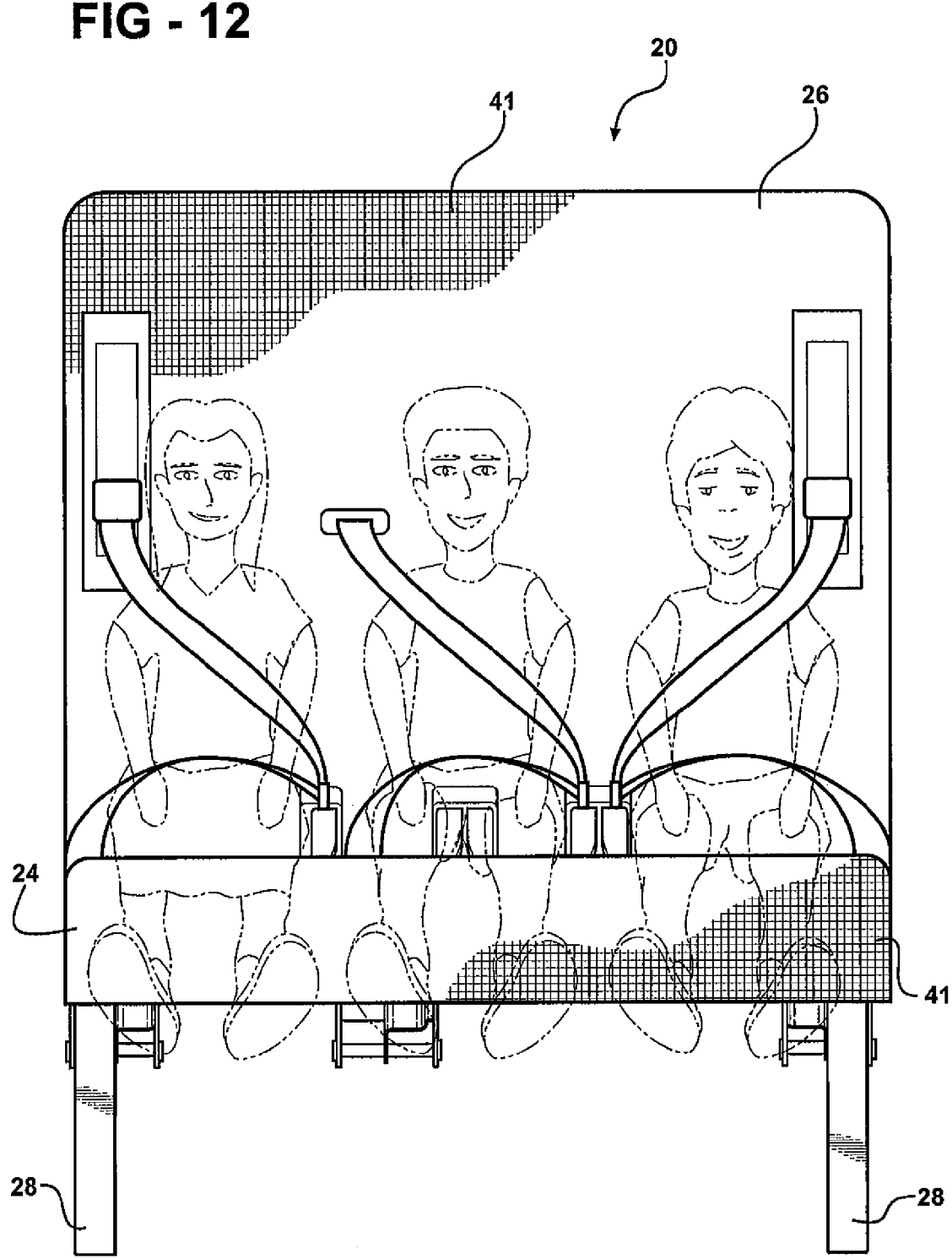
FIG. 12 is a front view of the seat assembly configured in a three passenger configuration.

The seatbelt assemblies 50 and the seatback 26 are configurable for use by either two larger passengers in a two passenger configuration or three smaller passengers in a three passenger configuration. The two passenger configuration is shown in FIG. 11 and the three passenger configuration is shown in FIG. 12. The clips 70 and the buckles 68 can be coded and/or keyed to assist the passengers in properly pairing the clips 70 and the buckles 68 for the two passenger configuration or the three passenger configuration. The clips 70 and buckles 68 may be visually coded, such as color coding, printed text, indicia or any other suitable coding.

The seat assembly 20 can include any type coverings 41, e.g., energy absorbing coverings or aesthetic coverings. As one example, the coverings 41 can include foam pillows positioned to absorb energy from a passenger who uncontrollably moves forward and strikes the seatback 26 in front of the passenger when the vehicle 22 is stopped abruptly. As another example, the covering 41 can include upholstery attached to the seatback 26 and the seat bottom 24. For example, the upholstery includes fabric and J-clips attached to the fabric. In such a configuration, the J-clips attach to the cover of the seatback 26 and attach to the seat bottom 24, e.g., the seat bottom frame 30. As such, the upholstery is removeable from the seat assembly 20 by disconnecting the J-clips from the seat bottom 24 and the seatback 26.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A seat assembly for a vehicle, said seat assembly comprising:
   a seat bottom including a seat bottom frame for supporting a passenger and a support rod fixed to said seat bottom frame and extending along an axis;
   a seatback including at least two towers spaced from each other along said axis and extending upwardly from said support rod, each tower defining a hole rotatably receiving said support rod so that said towers are rotatable relative to said seat bottom about said axis; and
   at least one seatbelt assembly having a belt extending along at least one of said towers, said at least one of said towers defining a channel with said belt extending in said channel;
   said seatback including a rigid cover having an inner surface defining a cavity receiving said towers, said rigid cover rigidly coupling said towers to each other so that said towers and said rigid cover rotate together about said axis.

2. The seat assembly as set forth in claim 1 wherein said support rod has a round cross-section and said holes defined by said towers are round.

3. The seat assembly as set forth in claim 1 wherein said at least one of said towers has a U-shaped cross-section defined by a first edge, a second edge spaced from said first edge, and a surface extending from said first edge to said second edge defining said channel between said first edge and said second edge.

4. The seat assembly as set forth in claim 3 wherein said inner surface extends from said first edge to said second edge of said tower for enclosing said belt along said channel.

5. The seat assembly as set forth in claim 1 further including a stopping member coupled to at least one of said towers and to said seat bottom with said stopping member allowing rotation of said tower from an upright position to a forward position and preventing further rotation of said tower beyond said forward position.

6. The seat assembly as set forth in claim 5 wherein said tower presents an extension extending downwardly from said seat bottom with said stopping member extending from said extension to said seat bottom below said seat bottom.

7. A seat assembly for a vehicle, said seat assembly comprising:
   a seat bottom including a seat bottom frame for supporting a passenger and a support rod fixed to said seat bottom frame and extending along an axis; and
   a seatback including at least two towers spaced from each other along said axis and extending upwardly from said support rod, each tower defining a hole rotatably receiving said support rod so that said towers are rotatable relative to said seat bottom about said axis;
   said seatback including a rigid cover receiving said towers and rigidly coupling said towers to each other so that said towers and said rigid cover rotate together about said axis.

8. The seat assembly as set forth in claim 7 wherein said support rod has a round cross-section and said holes defined by said towers are round.

9. The seat assembly as set forth in claim 7 wherein said rigid cover has an inner surface defining a cavity receiving said towers.

10. The seat assembly as set forth in claim 7 further comprising at least one seatbelt assembly having a belt extending along at least one of said towers.

11. The seat assembly as set forth in claim 10 wherein said seatbelt assembly includes a retractor coupled to said tower with said belt extendable from and retractable to said retractor.

12. The seat assembly as set forth in claim 10 further comprising a guide coupled to said tower and defining an orifice with said belt slideably extending through said orifice.

13. The seat assembly as set forth in claim 12 wherein said tower extends between a proximate portion coupled to said seat bottom and a distal portion spaced from said proximate portion with said retractor fixed to said proximate portion and with said guide fixed to said distal portion.

14. The seat assembly as set forth in claim 12 wherein said belt extends from said retractor through said guide.

15. The seat assembly as set forth in claim 10 wherein said at least one of said towers defines a channel with said belt extending in said channel.

16. The seat assembly as set forth in claim 15 wherein said at least one of said towers has a U-shaped cross-section defined by a first edge, a second edge spaced from said first edge, and a surface extending from said first edge to said second edge defining said channel between said first edge and said second edge.

17. The seat assembly as set forth in claim 16 wherein said rigid cover has an inner surface defining a cavity receiving said towers, said inner surface extending from said first edge to said second edge of said tower for enclosing said belt along said channel.

18. The seat assembly as set forth in claim 7 further including a stopping member coupled to at least one of said towers and to said seat bottom with said stopping member allowing rotation of said tower from an upright position to a forward position and preventing further rotation of said tower beyond said forward position.

19. The seat assembly as set forth in claim 18 wherein said stopping member is further defined as a strap extending between a first attachment end coupled to said tower and a second attachment end coupled to said seat bottom with said strap defining a bend between said first and second attachment ends when said tower is in said upright position and with said bend plastically deforming as said tower rotates from said upright position toward said forward position.

20. The seat assembly as set forth in claim 18 wherein said tower presents an extension extending downwardly from said seat bottom with said stopping member extending from said extension to said seat bottom below said seat bottom.

* * * * *